US010006346B2

(12) United States Patent
Kemmerling et al.

(10) Patent No.: US 10,006,346 B2
(45) Date of Patent: Jun. 26, 2018

(54) ENGINE SYSTEM WITH INTAKE AIR-SUPPLY TURBINE AND MOTOR-DRIVEN COMPRESSOR (71) Applicant: Ford Global Technologies, LLC, Dearborn, MI (US)

(72) Inventors: Joerg Kemmerling, Monschau (DE); Helmut Matthias Kindl, Aachen (DE); Vanco Smiljanovski, Bedburg (DE); Frank Kraemer, Neunkirchen-Seelscheid (DE); Franz Arnd Sommerhoff, Aachen (DE); Andreas Kuske, Geulle (NL); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 15/137,980

(22) Filed: Apr. 25, 2016

(65) Prior Publication Data
US 2016/0319730 A1 Nov. 3, 2016

(30) Foreign Application Priority Data
Apr. 28, 2015 (DE) .................. 10 2015 207 791

(51) Int. Cl.
F02B 33/44 (2006.01)
F02B 37/04 (2006.01)
F02B 37/16 (2006.01)

(52) U.S. Cl.
CPC ............. *F02B 37/16* (2013.01); *F02B 37/04* (2013.01); *F02B 37/164* (2013.01); *Y02T 10/144* (2013.01)

(58) Field of Classification Search
CPC ........ F02B 37/16; F02B 37/04; F02B 37/164; F02B 37/013; Y02T 10/144
(Continued)

(56) References Cited

U.S. PATENT DOCUMENTS 6,158,218 A * 12/2000 Herold ................... F02B 37/04
60/609
6,256,994 B1 * 7/2001 Dillon, IV ............... F02C 6/06
60/649

(Continued)

FOREIGN PATENT DOCUMENTS

DE 19641467 A1 4/1998
DE 602004000194 T2 8/2006

(Continued)

Primary Examiner — Thai Ba Trieu
(74) Attorney, Agent, or Firm — Julia Voutyras; McCoy Russell LLP (57) ABSTRACT A method for operation of an engine. The method includes during a first operating condition, permitting intake airflow through an intake air-supply turbine positioned upstream of a cylinder to drive a generator, the generator coupled to an energy storage device, and inhibiting intake airflow through a motor-driven compressor arranged in parallel flow arrangement with the intake air-supply turbine, the motor driven compressor coupled to a motor coupled to the energy storage device. The method further includes during a second operating condition, permitting intake airflow through the motor-driven compressor while the motor-driven compressor receives rotation input from the motor, and inhibiting intake airflow through the intake air-supply turbine.

20 Claims, 3 Drawing Sheets (58) Field of Classification Search
USPC .................. 60/608–609, 612, 605.1, 611
See application file for complete search history.

(56) References Cited

U.S. PATENT DOCUMENTS

| | | | |
|---|---|---|---|
| 7,152,393 | B2 | 12/2006 | Hergemöller et al. |
| 8,522,757 | B2 | 9/2013 | Vuk |
| 8,943,823 | B2 * | 2/2015 | Fiveland ............... F02B 37/18 60/612 |
| 9,163,555 | B2 | 10/2015 | McConville et al. |
| 2006/0162335 | A1 | 7/2006 | Vuk |
| 2006/0248888 | A1 | 11/2006 | Geskes |
| 2007/0033939 | A1 * | 2/2007 | Wang ............... F02B 29/04 60/612 |
| 2011/0097225 | A1 * | 4/2011 | Freund ............... F04D 17/12 417/423.5 |
| 2014/0053547 | A1 * | 2/2014 | Wade ............... F02B 37/04 60/599 |
| 2015/0337846 | A1 * | 11/2015 | Thelen ............... F04D 17/10 415/1 |

FOREIGN PATENT DOCUMENTS

| | | | |
|---|---|---|---|
| DE | 102010035085 A1 | 2/2012 | |
| DE | 102013203042 A1 | 10/2013 | |
| DE | 102012224078 A1 | 6/2014 | |
| EP | 2886827 A1 | 6/2015 | |
| FR | 2852356 A1 * | 9/2004 | ............ F02B 37/04 |

* cited by examiner

FIG. 1

ENGINE SYSTEM WITH INTAKE AIR-SUPPLY TURBINE AND MOTOR-DRIVEN COMPRESSOR

CROSS REFERENCE TO RELATED APPLICATION

This application claims priority to German Patent Application No. 102015207791.8, filed Apr. 28, 2015, the entire contents of which are hereby incorporated by reference for all purposes.

BACKGROUND/SUMMARY

Turbochargers are incorporated into internal combustion engines to improve combustion operation. Boost provided by turbochargers allows an engine to produce greater power output or enables an engine to be downsized while providing power output equivalent to a larger naturally aspirated engine. DE 102013203042 A1 discloses a turbocharger for an internal combustion engine, having an oil-lubricated bearing, a supply line for the oil and a throughflow limiter for the oil. The turbocharger disclosed in DE 102013203042 A1 can generate excess boost when increased engine power is not desired, increasing engine inefficiency. Exhaust driven turbochargers can also experience lag caused by inertia, friction, and compressor load in the turbocharger. Turbocharger lag negatively impacts vehicle throttle response which can detract from the vehicle's consumer appeal.

To address at least some of the aforementioned problems, a method for operation of an engine is provided. The method includes during a first operating condition, permitting intake airflow through an intake air-supply turbine positioned upstream of a cylinder to drive a generator, the generator coupled to an energy storage device, and inhibiting intake airflow through a motor-driven compressor arranged in parallel flow arrangement with the intake air-supply turbine, the motor driven compressor coupled to a motor coupled to the energy storage device. The method further includes during a second operating condition, permitting intake airflow through the motor-driven compressor while the motor-driven compressor receives rotation input from the motor, and inhibiting intake airflow through the intake air-supply turbine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to a motor vehicle having an internal combustion engine, an air-supply tract, an exhaust gas tract and a compressor which is arranged in the air-supply tract. The motor vehicle may include an air-supply tract which provides improved engine boosting and efficiency as well as other advantages.

In one example, the motor vehicle may include an internal combustion engine, an air-supply tract, an exhaust gas tract and a compressor which is arranged in the air-supply tract. The motor vehicle may additionally have a generator and an intake air-supply turbine which is arranged in the air-supply tract downstream of the compressor. Thus, the intake air-supply turbine has intake air flowing therethrough during operation and is therefore positioned upstream of a cylinder as opposed to an exhaust gas turbine having exhaust gas flowing therethrough positioned downstream of the cylinder.

Continuing with the previous example, the intake air-supply turbine may be connected to the generator so as to transmit torque thereto. The compressor may be included in an exhaust gas turbocharger and is in this case connected to an exhaust gas turbine arranged in the exhaust gas tract. The exhaust gas turbine may be positioned downstream of the cylinder and be configured to transmit torque to the compressor.

It may be advantageously possible with the intake air-supply turbine to use charging pressure, which is produced by the upstream compressor and which is not desired for a current driving situation, for energy recovery, in particular when the compressor is driven by the exhaust gas turbine which draws energy from the exhaust gas flow and drives the compressor therewith. The generator generates energy when the intake air-supply turbine provides torque input via a turbine shaft to the generator. The energy generated by the generator can be used to drive other components, such as a motor driver compressor.

The throughflow quantity of the supply air can further be influenced with the intake air-supply turbine. That is to say that the amount of air supplied to a cylinder may be affected by the intake air-supply turbine. Therefore, a valve may be positioned in one or more of the conduits in the air-supply tract. The valve can be operated to adjust an amount of intake air flowing to the downstream cylinder.

Furthermore, the supply air traveling through the intake air-supply turbine during turbine operation expands and becomes cooler due to the properties of the turbine. The cooled intake air can be advantageous for reducing combustion knock in the engine. A reduction in combustion knock can correspondingly increase the engine's combustion efficiency.

In another example the air-supply tract may include a plurality of conduits which extend parallel with each other. That is to say that the conduits have a parallel flow arrangement where the inlets of the conduits are connected (e.g., directly connected) to one another and the outlet of the conduits are connected (e.g., directly connected) to one another. Continuing with this example, the intake air-supply turbine may be arranged in an intake air-supply turbine conduit included in the plurality of conduits of the air-supply tract. It may be therefore possible to direct the air-supply flow where desired through the intake air-supply turbine, for example, during partial-load operation, and during other operating conditions to direct air around the intake air-supply turbine such that it bypasses the intake air-supply turbine.

In another example of the motor vehicle, the intake air-supply turbine may have adjustable guiding vanes. That is to say that the geometry of the guide vanes may be adjusted to alter the amount of intake air flowing through the intake air-supply turbine. As a result, the intake air-supply turbine can be used in a more versatile manner and can be operated more effectively. For instance, the guiding vanes in the intake air-supply turbine may be adjusted to increase/decrease the air supplied to the cylinder from the intake air-supply turbine. In this way, a variable geometry intake air-supply turbine can act as an engine throttling mechanism to provide a desired amount of airflow to the cylinder.

In another example, the generator may be constructed in such a manner that a torque needed for driving the generator can be varied. That is to say that the intake air-supply turbine can provide different magnitudes of rotational input to the generator. Additionally, the generator may be an electrical generator. In such an example, the generator may thereby be used as a variable load on the intake air-supply turbine. The variable load of the generator on the intake air-supply turbine can therefore be used to throttle the air-supply flowing through the turbine. For instance, the generator may be adjusted to exert an increased load on the intake air-supply turbine to slow the turbine when increased intake air throttling is desired. On the other hand, the generator may be adjusted to exert a decreased amount of load on the intake air-supply turbine to increase turbine speed when decreased intake air throttling is desired.

In another example of motor vehicle, the generator may be operationally connected to an energy storage device (e.g., battery, capacitor, etc.) Therefore, the energy provided by the generator can be stored and made available for other applications, if desired. In this way, energy may be conserved in the motor vehicle, thereby increasing vehicle efficiency and improving fuel economy. In such an example, the motor may be operationally connected to the energy storage device. In this example, the motor can thereby be operated with the energy which is stored in the energy storage device, when desired. It will be appreciated that the energy stored in the energy storage device may be previously produced by the generator. In this way, energy can be conserved in the engine, to increase engine efficiency. For instance, excess energy in the intake system can be transferred to the energy storage device through operation of the supply air turbine and generator during certain operating conditions (e.g., low load, deceleration, etc.) Subsequently during other operating conditions (e.g., high load, acceleration, etc.,) the excess energy stored in the energy storage device can be used to drive a motor-driven compressor to increase engine output. As a result, engine efficiency can be increased.

In another example of the motor vehicle, an additional compressor may be arranged downstream of the compressor in the air-supply tract. The additional compressor may be driven by a motor (e.g., an electric motor) and therefore may be referred to as a motor-driven compressor. It is therefore possible to provide a desired charging pressure via two compressors. The motor-driven compressor has the advantage, over a turbocharger compressor, of being able to be operated independently of the present state of the exhaust gas flow, if desired. Therefore, in some examples the motor-driven compressor may be operated to reduce turbo-lag in the engine. For instance, the motor-driven compressor may be operated during engine power transitions to reduce the delay between a throttle change and a corresponding change in engine power output, when desired. In other examples, both the motor-drive compressor and upstream compressor may be operated together to increase the boost provided to the cylinder to increase engine output.

In another example of the motor vehicle, the air-supply tract may include a bypass conduit, bypassing the intake air-supply turbine and the motor-driven compressor. Therefore, the bypass conduit may be arranged in a parallel flow configuration with the conduits in which the intake air-supply turbine and the motor-driven compressor are arranged. As a result, the air-supply flow can be directed around the motor driven compressor and the intake air-supply turbine when operation of the turbine or compressor is not desired.

Figure 1:
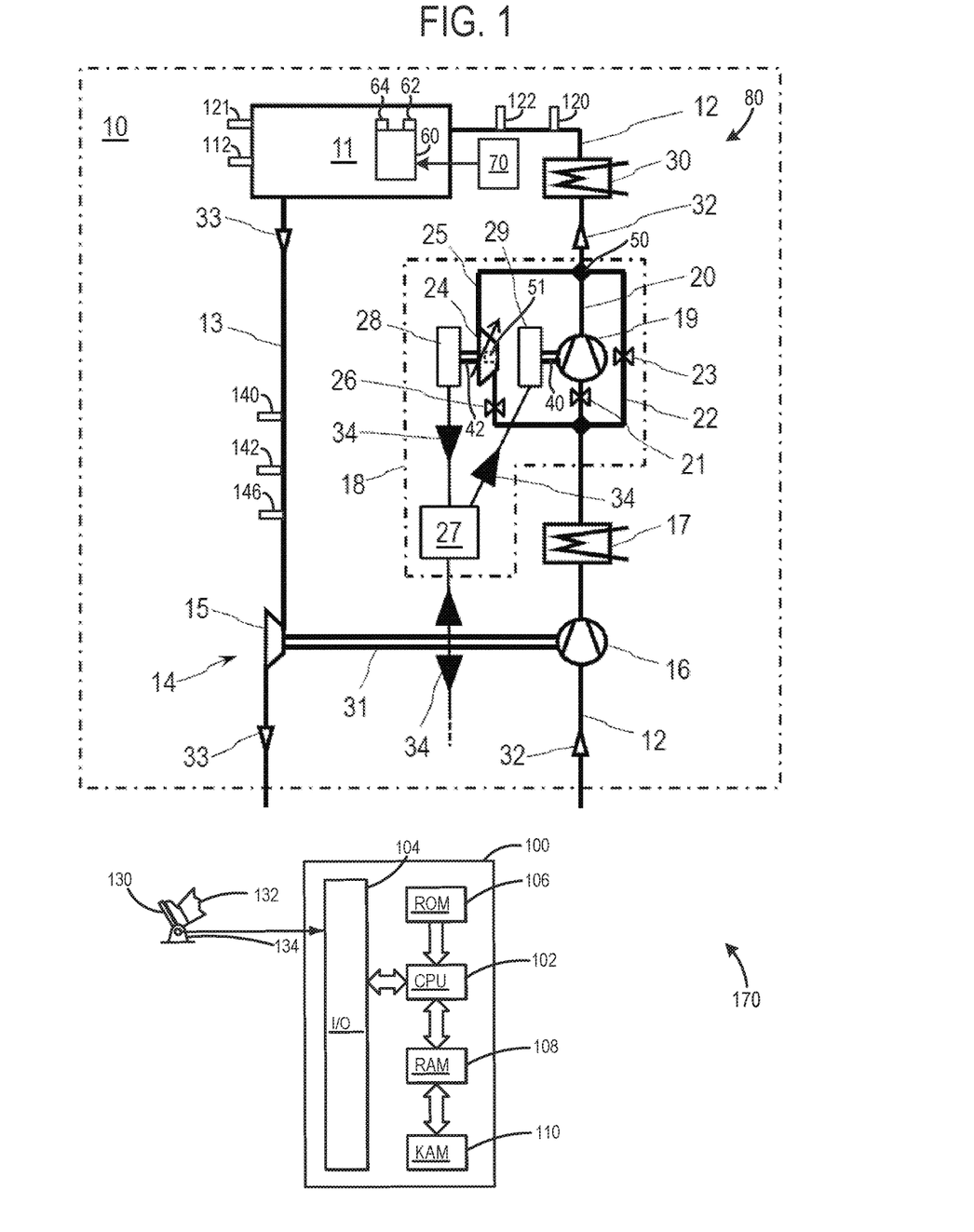
FIG. 1 shows a motor vehicle with an intake air-supply turbine and motor-driven compressor in an exemplary embodiment.

FIG. 1 schematically illustrates the motor vehicle 10 in an exemplary embodiment. The motor vehicle 10 includes an internal combustion engine 11 providing motive power to the motor vehicle 10. The motor vehicle 10 further has an air-supply tract 12 which is configured to supply air 32 to the internal combustion engine 11 for the operation thereof. The motor vehicle 10 has an exhaust gas tract 13 in order to discharge an exhaust gas 33 which is produced during operation of the internal combustion engine 11. The internal combustion engine 11 includes at least one cylinder 60 configured to implement combustion operation therein. An intake valve 62 and exhaust valve 64 may be coupled to the cylinder 60. The intake and exhaust valves may be configured to flow intake air into the cylinder and exhaust gas out of the cylinder, respectively, at selected time intervals. For instance, a four stroke combustion cycle (i.e., intake, compression, combustion, and exhaust strokes) may be implemented in the cylinder 60 through operation of the intake and exhaust valves 62 and 64. A fuel delivery system 70 may also be configured to supply fuel to the cylinder 60. Port and/or direct injection systems may be used to accomplish the metered fuel delivery in the engine.

The motor vehicle 10 may include a compressor 16 which is arranged in the air-supply tract 12. The compressor 16 may be included in an exhaust gas turbocharger 14 and in such an example is connected to an exhaust gas turbine 15 arranged in the exhaust gas tract 13. The compressor 16 is configured to generate boost and the exhaust gas turbine 15 is configured to convert exhaust gas energy into rotational energy. As such, torque is transferred between the exhaust gas turbine 15 and the compressor 16 during operation of the exhaust gas turbocharger 14. In particular, a compressor shaft of the compressor 16 may be connected to a turbine shaft of the exhaust gas turbine 15 so as to transmit torque, in particular the compressor shaft and the turbine shaft are formed from a single turbocharger shaft 31, in the depicted example. However, other suitable mechanisms for torque transmission between the exhaust gas turbine 15 and the compressor 16 have been contemplated.

In the exemplary embodiment depicted in FIG. 1, the motor vehicle 10 has a first charge air cooler 17 which is arranged in the air-supply tract 12 downstream of the compressor 16 and a second charge air cooler 30 downstream of the first charge air cooler 17 and upstream of the internal combustion engine 11. The first and second charge air coolers 17 and 30 are each configured to remove heat from intake air flowing therethrough to cool the intake air. Cooling the intake air in this way can enable combustion efficiency to be increased and enables engine emissions to be reduced.

The air-supply tract 12 includes a plurality of conduits 20, 22, and 25 which are arranged parallel with each other. That is to say that the conduits 20, 22, and 25 are arranged in a parallel flow configuration where the inlets and outlets of each conduit are connected to a common upstream/downstream intake passage. Additionally, the conduits 20, 22, and 25 which are arranged parallel with each other have the same throughflow direction; a geometric parallelism does not necessarily have to be provided in this case. In FIG. 1, the conduits 20, 22, and 25 may be referred to as a motor-driven compressor conduit 20, a bypass conduit 22, and an intake air-supply turbine conduit 25. Thus, the air-supply tract 12 branches downstream of the first charge air cooler 17 into the three conduits 20, 22, 25. Upstream of the internal combustion engine 11, in particular upstream of the second charge air cooler 30, the three conduits 20, 22, 25 join together at a conduit confluence 50. Further in one example, there may be arranged in the air-supply tract 12 at least one valve which is constructed to block one of the different conduits 20, 22, 25 or to release them at least to a given extent. For instance, the valve may be configured to regulate airflow through the motor-driven compressor, intake air-supply turbine, or bypass conduit. The valve may be, for example, a directional control valve. Specifically in the depicted example, a valve 26 is provided in the intake air-supply turbine conduit 25, a valve 21 is provided in the motor-driven compressor conduit 20, and a valve 23 is provided in the bypass conduit 22. In this way the amount of intake air flowing through each of the conduits can be independently adjusted, if desired. However, other valve arrangements have been contemplated.

The motor vehicle 10 may also include an engine system 18 (e.g., boost system) including the intake air-supply turbine 24. The intake air-supply turbine 24 is arranged in the air-supply tract 12. In particular, the intake air-supply turbine 24 is arranged in the intake air-supply turbine conduit 25 of the air-supply tract 12. An intake air-supply turbine valve 26 can be connected upstream of the intake air-supply turbine 24 and is constructed to block the intake air-supply turbine conduit 25 or to release it at least to a given extent. The intake air-supply turbine 24 draws energy 34 from the supply air 32 in such a manner that the supply air 32 has a smaller pressure downstream of the intake air-supply turbine 24 than upstream of the intake air-supply turbine 24. The supply air 32 expands over the intake air-supply turbine 24. As a result, the engine system 18 can act as a throttle, when needed. The motor vehicle 10 described herein may not have a throttle valve in the air-supply tract, in one instance. The intake air-supply turbine 24 can comprise adjustable guiding vanes 51 and therefore have variable turbine geometry. As a result, the amount of supply air 32 provided to the engine 11 can be adjusted by adjusting the geometry of the intake air-supply turbine 24.

The engine system 18 may also include the motor-driven compressor 19. The motor-driven compressor 19 is arranged in the air-supply tract 12 in particular in the motor-driven compressor conduit 20. As previously discussed a valve 21 (e.g., motor-driven compressor valve) can be positioned upstream of the motor-driven compressor 19 and is constructed to block the motor-driven compressor conduit 20 or to release it at least to a given extent. The motor-driven compressor 19 is configured to increase the charging pressure of the intake air.

In order to be able to direct the supply air 32 past the motor-driven compressor 19 and/or the intake air-supply turbine 24, the air-supply tract 12 has the bypass conduit 22. A bypass valve 23 can be arranged in the bypass conduit 22 and is constructed to block the bypass conduit 22 or to release it at least to a given extent.

The engine system 18 further comprises a generator 28 which can be driven by the intake air-supply turbine 24. The generator 28 is connected to the intake air-supply turbine 24 so as to transmit torque via an output shaft 42. In one example, the generator 28 may be an electrical generator 28 which converts the rotational movement of a turbine shaft of the intake air-supply turbine 24 into electrical energy 34. The generator 28 is particularly constructed in such a manner that a torque necessary for driving the generator 28 can be varied. The generator 28 is therefore a variable load for the intake air-supply turbine 24. The degree of influence of the supply air 32 by the intake air-supply turbine 24 is also thereby adjustable. The generator 28 is electrically coupled to the energy storage device 27.

The engine system 18 may also include a motor 29 which is constructed to selectively drive the motor-driven compressor 19. The motor 29 can be connected to the motor-driven compressor 19 so as to transmit torque via a shaft 40. The motor 29 is an electric motor in the depicted embodiment. However, other types of motors have been contemplated. The motor 29 is also electrically coupled to an energy storage device 27.

The engine system 18 can also include the energy storage device 27 which is connected to the generator 28 and the motor 29. The generator 28 is connected to the energy store 27 in such a manner that the energy 34 generated by the generator 28 can be directed to the energy storage device 27. The motor 29 is connected to the energy storage device 27 in such a manner that the energy 34 stored in the energy storage device 27 can be directed to the motor 29. The engine system 18 is constructed in such a manner that the energy 34 generated by the generator 28 can be stored in the energy storage device 27 and can be used for operating the motor 29 and consequently for driving the motor-driven compressor 19. The energy storage device 27 may be, for example, an accumulator, a battery, or a capacitor (e.g., supercapacitor.) The energy storage device 27 of the engine system 18 may be operationally connected to other motor vehicle systems which user electrical energy, such as a starter motor, entertainment system, lights, powered windows, windshield wipers, etc.

Additionally in one example, the air-supply tract 12, intake valve 62, compressor 16, motor-driven compressor 19, intake air-supply turbine 24, valves 21, 23, and 26, first charge air cooler 17, and/or second charge air cooler 30 may be included in an intake system 80. The air-supply tract 12 may also be referred to as an engine intake.

Controller 100 is shown in FIG. 1 as a conventional microcomputer including: microprocessor unit 102, input/output ports 104, read-only memory 106, random access memory 108, keep alive memory 110, and a conventional data bus. Controller 100 is shown receiving various signals from sensors coupled to engine 10, in addition to those signals previously discussed, including: engine coolant temperature (ECT) from temperature sensor 112 coupled to a cooling sleeve, for example; a position sensor 134 coupled to an accelerator pedal 130 for sensing force applied by foot 132; a measurement of engine manifold pressure (MAP) from pressure sensor 122 coupled to the air-supply tract 12; an engine position sensor from a Hall effect sensor (not shown) sensing crankshaft position; a measurement of air mass entering the engine from sensor 120, and engine speed sensor 121. Barometric pressure may also be sensed (sensor not shown) for processing by controller 100. Controller 100 may also receive signals from sensors located in the emission system such as exhaust gas composition sensor 140, temperature sensor 142, and/or airflow sensor 146. The controller 100 may also be configured to command adjustment of one or more actuators in the engine 10. For instance, the controller 100 may be configured to adjust the generator 28, motor 29, the intake air-supply turbine 24 (e.g., variable geometry turbine), motor-driven compressor 19, valves 21, 23, and 26, energy storage device 27, fuel delivery system 70, and/or other components in the engine system 18. Additionally, the controller 100, actuators, and sensors may be included in a control system 170, in one example. In some example, the control system 170 may be part of a larger system such as the engine system 18 and may therefore be referred to as a control subsystem. Moreover, the control system 170 may be configured to implement the methods described with regard to FIGS. 2-3, the control system implementing the various acts and operations described herein via the controller in combination with sensors and actuators, including the sensors described above and the various engine components coupled with the actuators.

Continuing with FIG. 1, the control system 170 may be configured to adjust the flow of intake air through the intake air-supply turbine valve and the motor-driven compressor valve based on engine operating conditions. For example the control system may be configured to open the intake air-supply turbine valve 26 and close the motor-driven compressor valve 21 during a first operating condition via actuators, such as electromechanical or electrohydraulic actuators, for example. The control system 170 may also be designed to, during the first operating condition, command the generator to transfer energy from the generator to the energy storage device. The first operating condition may include a condition where the compressor 16 is generating excess boost, the motor vehicle 10 is decelerating, and/or the engine is below a threshold speed. Continuing with such an example, the control system 170 may also be configured to, during a second operating condition, open the motor-driven compressor valve 21 and command the motor 29 to drive the motor-driven compressor 19 and close the intake air-supply turbine valve 26. In one example, the control system 170 may be configured to transfer energy from the energy storage device 27 to the motor 29 when the motor 29 is commanded to drive the motor-driven compressor 19. The second operating condition may be when increased engine output is requested, when the engine is under increased load, and/or when the compressor 16 is not providing a desired amount of boost to the engine. Additionally, the control system 170 may be configured to adjust the bypass valve 23 during the first and second operating conditions to modulate the intake air flowing to the intake air-supply turbine or motor-driven compressor. Thus, the bypass valve may act as a wastegate or throttle valve during different operating conditions. Furthermore, it will be appreciated that the control system 170 may be configured to implement the methods described herein.

Figure 2:
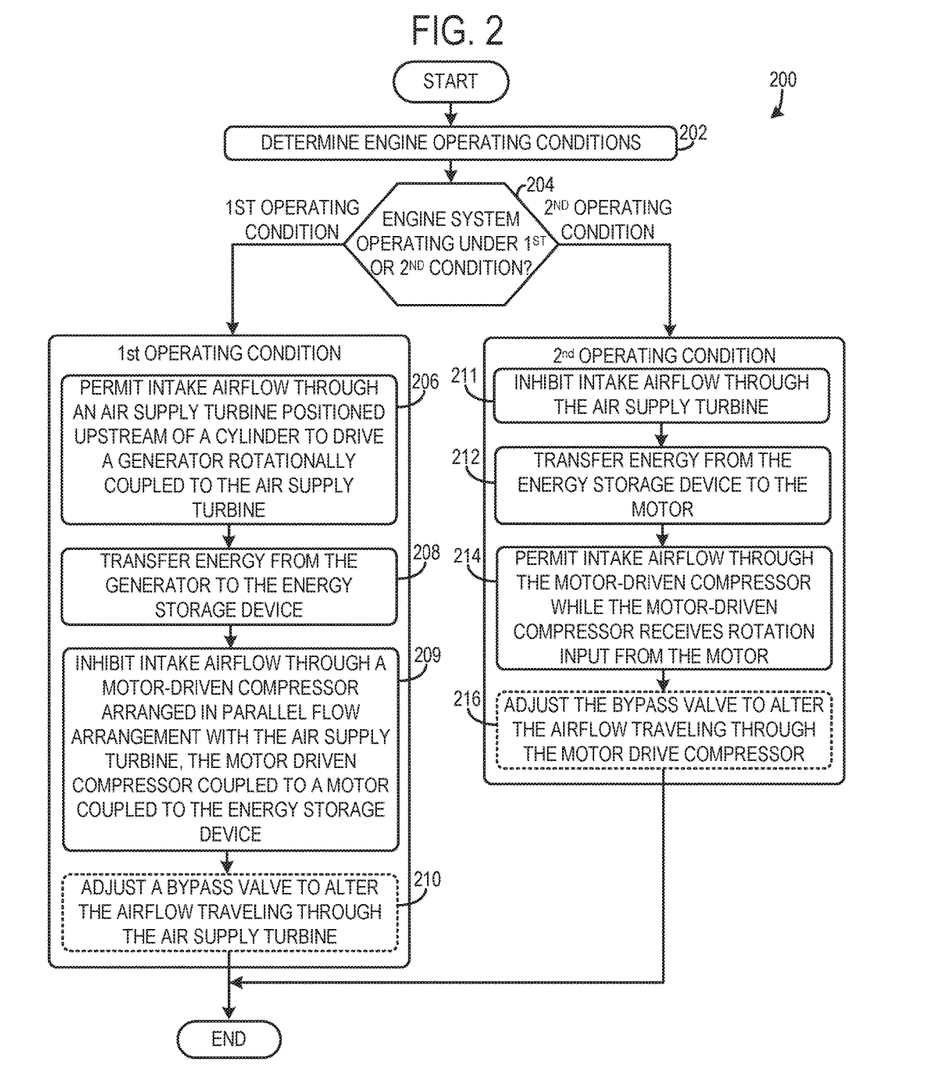
FIG. 2 shows a method for operation of a system for an internal combustion engine including an intake air-supply turbine and motor-driven compressor.

FIG. 2 shows a method 200 for operation of a system for an internal combustion engine such as the engine system 18 in FIG. 1 or another suitable engine system. At 202 the method includes determining engine operating conditions. The operating conditions may include manifold air pressure, engine torque request, engine speed, variable geometry turbine position, engine temperature, exhaust gas pressure, etc.

Next at 204 the method includes determining if the engine system is operating under a first operating condition or a second operating condition. For instance, the first operating condition may be when the engine is generating excess boost and the second operating condition may be when increased engine boost is needed. Several factors can indicate generation of excess boost such as an increase in engine throttling and engine/vehicle deceleration. Factors such as engine speed, engine output request, manifold air pressure, etc., may be used to determine when increased boost is needed.

If the engine system is operating under the first operating condition the method advances to 206. At 206 the method includes permitting intake airflow through an intake air-supply turbine positioned upstream of a cylinder to drive a generator rotationally coupled to the intake air-supply turbine. The generator is coupled to an energy storage device such as a battery, capacitor, etc. Additionally in one example, permitting intake airflow through the intake air-supply turbine may include opening an intake air-supply turbine valve. Next at 208 the method includes transferring energy from the generator to the energy storage device. An electrical conduit may enable the energy transferred between the generator and energy storage device. Transferring energy to the energy storage device in this manner enables excess energy in the intake system to be captured and stored for subsequent use, increasing engine efficiency.

At 209 the method includes inhibiting intake airflow through a motor-driven compressor arranged in a parallel flow arrangement with the intake air-supply turbine. The motor driven compressor is coupled to a motor configured to receive energy from to the energy storage device during operation. Additionally, inhibiting intake airflow through the motor-driven compressor may include closing a motor-driven compressor valve.

Next at 210 the method may include adjusting a bypass valve to alter the airflow traveling through the intake air-supply turbine. The bypass valve is positioned in a bypass conduit positioned in a parallel flow arrangement with the intake air-supply turbine and the motor-driven compressor. The bypass valve can be adjusted in this way to control the amount of intake air flowing through the intake air-supply turbine. For example, the bypass valve may be opened to decrease the amount of intake airflow through the intake air-supply turbine to increase the manifold air pressure.

Further in one example, the intake air-supply turbine may be a variable geometry turbine. Therefore in such an example, the variable geometry turbine may be adjusted during the first operating condition to vary the flowrate of intake air to the engine based on engine output requests. Thus, the variable geometry turbine can be operated in this way to function as an engine throttle valve. The variable geometry turbine can therefore provide dual-functionality in the engine. In such an example, the variable geometry turbine may be adjusted in concert with a throttle valve or may be used in place of a throttle valve, in some examples.

On the other hand, if the engine system is operating under the second operating condition the method advances to 211. At 211 the method includes inhibiting intake airflow through the intake air-supply turbine. Step 211 may be accomplished by closing the intake air-supply turbine valve to enable intake airflow to be directed to the motor-driven compressor. Next at 212 the method includes transferring energy from the energy storage device to the motor. In this way, energy previously generated through operation of the intake air-supply turbine and associated generator can be used to power other engine functions at a later time.

Next at 214 the method includes permitting intake airflow through the motor-driven compressor while the motor-driven compressor receives rotation input from the motor. In this way, the motor-driven compressor can be operated to provide supplemental boost to the engine during selected time intervals when increased engine power output is desired. It will be appreciated that the energy stored in the energy storage device used to power the motor may have been previously generated by the generator coupled to the intake air-supply turbine.

Further in one example the method may additionally include, during the first and/or second operating conditions, adjusting a bypass valve in a bypass conduit positioned in a parallel flow arrangement with the motor-driven compressor and the intake air-supply turbine to alter an amount of airflow passing through the bypass conduit. In this way, output of the motor-driven compressor or input to the intake air-supply turbine can be modulated to achieve desired engine boost or capture and store excess energy in the intake airflow.

Next at 216 the method may include adjusting the bypass valve to alter the airflow traveling through the motor-driven compressor. The bypass valve can be adjusted in this way to control the amount of boost generated by the motor-driven compressor. Thus, the bypass valve can function as a wastegate in this context.

Figure 3:
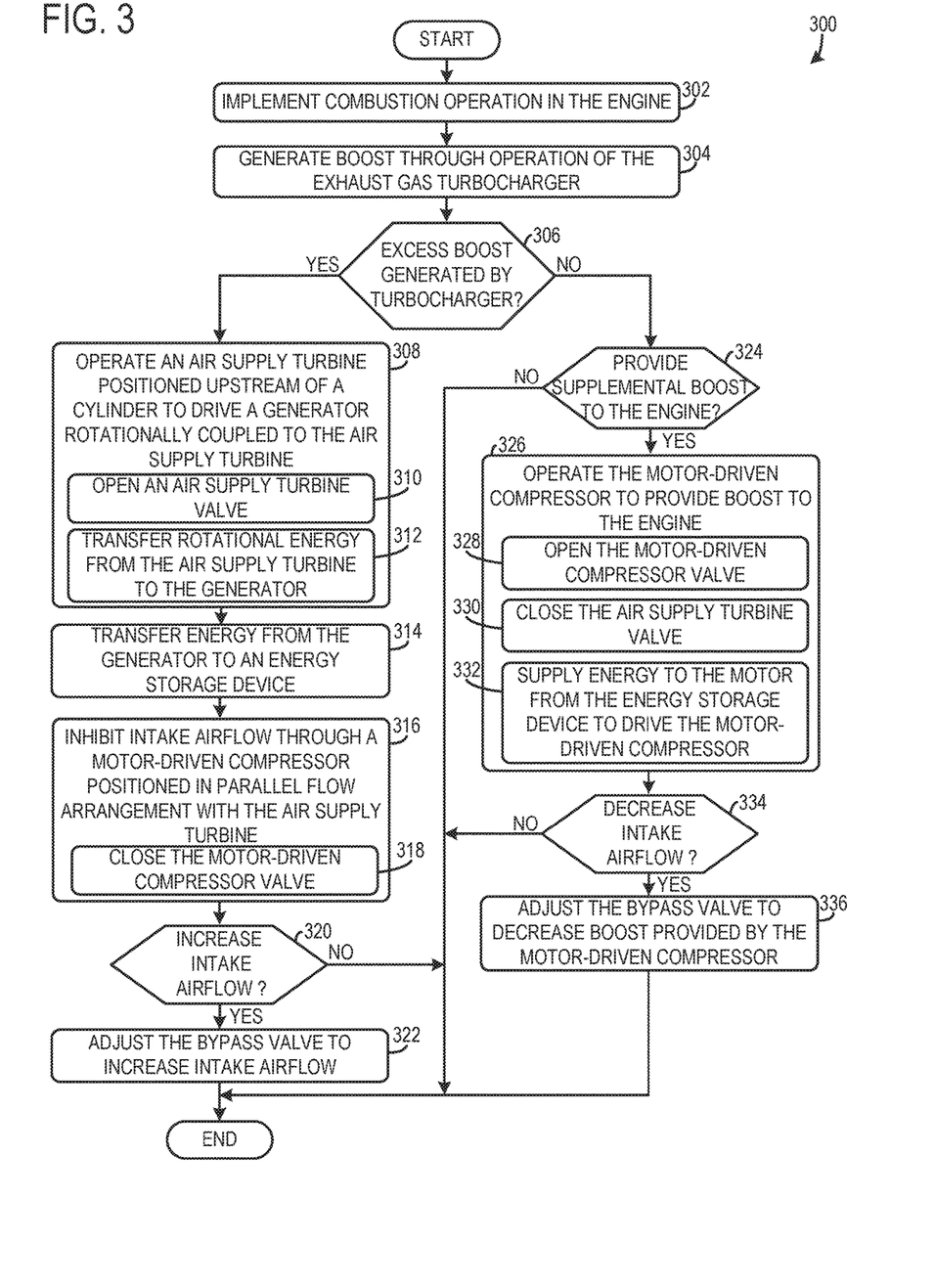
FIG. 3 shows a more detailed method for operation of a system for an internal combustion engine including an intake air-supply turbine and motor-driven compressor.

FIG. 3 shows a more detailed method 300 for operation of a system for an internal combustion engine. The method 300 may be implemented by the engine system 18 discussed above with regard to FIG. 1 or another suitable engine system.

At 302 the method includes implementing combustion operation in the engine. For instance, cyclical four stroke combustion cycles may be carried out in the engine. Next at 304 the method includes generating boost through operation of the exhaust gas turbocharger. Generating boost through operation of the exhaust gas turbocharger can include driving an exhaust gas turbine position in an exhaust conduit with exhaust gas and transferring rotational energy from the exhaust gas turbine to a compressor positioned in an intake tract.

Next at 306 the method includes determining if the exhaust gas turbocharger is generating excess boost. Several indicators may be used to determine generation of excess boost in the engine such as engine speed, engine deceleration, vehicle deceleration, engine throttling, exhaust drive turbocharger speed, etc. For instance, if engine speed is below a threshold value and/or if engine throttling exceeds a predetermined value it may be ascertained that excess boost is being generated in the engine. Manifold air pressure may also be used to determine if the boost generated in the engine is greater than a desirable value.

If it is determined that the turbocharger is generating excess boost the method advances to 308. At 308 the method includes operating an intake air-supply turbine positioned upstream of a cylinder to drive a generator rotationally coupled to the intake air-supply turbine. Additionally, the intake air-supply turbine is positioned downstream of a compressor in the exhaust gas turbocharger. Operating the intake air-supply turbine to drive the generator may include at 310 opening an intake air-supply turbine valve and at 312 transferring rotational energy from the intake air-supply turbine to the generator. Next at 314 the method includes transferring energy from the generator to an energy storage device. In this way, excess energy in the intake system can be captured and stored for later use, thereby increasing engine efficiency.

At 316 the method includes inhibiting intake airflow through a motor-driven compressor arranged in parallel flow arrangement with the intake air-supply turbine. Inhibiting intake airflow through the motor-driven compressor may include at 318 closing the motor-driven compressor valve. At 320 the method including determining if an increase in intake airflow to the cylinder is needed. For instance, a vehicle operator may request an increase in engine speed via an accelerator pedal or other suitable actuator. If it is determined that an increase in intake airflow is not needed (NO at 320) the method ends. However, if it is determined that an increase in intake airflow is needed (YES at 320) the method proceeds to 322. At 322 the method includes adjusting a bypass valve to increase intake airflow, the bypass valve positioned in a bypass conduit in a parallel flow arrangement with the intake air-supply turbine.

However, if it is determined that the turbocharger is not generating excess boost (NO at 306) the method advances to 324. At 324 the method including determining if supplemental boost should be provided to the engine from the motor-driven compressor. It may be determined that supplemental boost should be provided to the engine when increased engine power output is desired. Moreover, supplemental boost may be generated by the motor-driven compressor to decrease turbocharger lag. Thus, it may be determined that supplemental boost is needed during transition periods (e.g., turbocharger wind-up.)

If it is determined that supplemental boost should not be provided to the engine (NO at 324) the method ends. However, if it is determined that supplemental boost should be provided to the engine (YES at 324) the method proceeds to 326. At 326 the method includes operating the motor-driven compressor to provide boost to the engine. Operating the motor-drive compressor to provide boost to the engine may include at 328 opening the motor-drive compressor valve, at 330 closing the intake air-supply turbine valve, and at 332 supplying energy to the motor from the energy storage device to drive the motor-driven compressor.

Next at 334 the method includes determining if a decrease in engine intake airflow is needed. For instance, a vehicle operator may request a decrease in engine speed via a brake pedal or other suitable input device, release an accelerator pedal or other input device, etc.

If a decrease in engine intake airflow is not needed (NO at 334) the method ends. However, if a decrease in engine intake airflow is needed (YES at 334) the method advances to 336. At 336 the method includes adjusting the bypass valve to decrease boost provided by the motor-driven compressor adjusting the bypass valve to decrease engine intake airflow. As previously discussed the bypass valve is positioned in a parallel flow arrangement with the motor-driven compressor. Thus, the bypass valve can act as a wastegate when the motor-driven compressor is under operation.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The subject matter of the present disclosure is further described in the following paragraphs. According to one aspect, a motor vehicle is provided. The motor vehicle includes an internal combustion engine, an air-supply tract providing intake air to the internal combustion engine, an exhaust gas tract receiving exhaust gas from the internal combustion engine, a compressor which is arranged in the air-supply tract, an intake air-supply turbine which is arranged in an intake air-supply turbine conduit of the air-supply tract downstream of the compressor and is configured to transmit torque to a generator coupled to an energy storage device, and a motor-driven compressor positioned in a motor-driven compressor conduit in a parallel flow arrangement with the first intake conduit in the air-supply tract, the motor-driven compressor coupled to a motor configured to the energy storage device.

According to another aspect, a method for operation of an engine system. The method includes during a first operating condition, permitting intake airflow through an intake air-supply turbine positioned upstream of a cylinder to drive a generator rotationally coupled to the intake air-supply turbine, the generator coupled to an energy storage device, and inhibiting intake airflow through a motor-driven compressor arranged in parallel flow arrangement with the intake air-supply turbine, the motor driven compressor coupled to a motor coupled to the energy storage device, and during a second operating condition, permitting intake airflow through the motor-driven compressor while the motor-driven compressor receives rotation input from the motor, and inhibiting intake airflow through the intake air-supply turbine.

According to another aspect an engine system is provided. The engine system includes a compressor in an engine intake, an intake air-supply turbine arranged in the engine intake downstream of the compressor, an output shaft of the intake air-supply turbine coupled to a generator electrically coupled to an energy storage device, and a motor-driven compressor in the engine intake in a parallel flow arrangement with the intake air-supply turbine and having a shaft coupled to a motor electrically coupled to the energy storage device.

In any of the aspects described herein or combinations of the aspects, the motor vehicle may further include an intake air-supply turbine valve positioned in the intake air-supply turbine conduit, a motor-driven compressor valve positioned in the motor-driven compressor conduit, and a control system configured to adjust the flow of intake air through the intake air-supply turbine valve and the motor-driven compressor valve based on engine operating conditions.

In any of the aspects described herein or combinations of the aspects, the control system may be configured to, during a first operating condition, open the intake air-supply turbine valve and close the motor-driven compressor valve.

In any of the aspects described herein or combinations of the aspects, the control system may be configured to, during a second operating condition, open the motor-driven compressor valve and command the motor to drive the motor-driven compressor and close the intake air-supply turbine valve.

In any of the aspects described herein or combinations of the aspects, the first operating condition may include a condition where the compressor is generating excess boost.

In any of the aspects described herein or combinations of the aspects, the intake air-supply turbine may have adjustable guiding vanes.

In any of the aspects described herein or combinations of the aspects, the generator may be configured to receive a variable torque input from the intake air-supply turbine.

In any of the aspects described herein or combinations of the aspects, the air-supply tract may include a bypass conduit positioned in a parallel flow arrangement with the motor-driven compressor conduit and the intake air-supply turbine conduit.

In any of the aspects described herein or combinations of the aspects, the motor vehicle may further include a bypass valve positioned in the bypass conduit.

In any of the aspects described herein or combinations of the aspects, the compressor may be connected to an exhaust gas turbine which is arranged in the exhaust gas tract, the exhaust gas turbine configured to transmit torque to the compressor.

In any of the aspects described herein or combinations of the aspects, the method may also include during the first or second operating conditions, adjusting a bypass valve in a bypass conduit positioned in a parallel flow arrangement with the motor-driven compressor and the intake air-supply turbine to alter an amount of airflow passing through the bypass conduit.

In any of the aspects described herein or combinations of the aspects, the turbine may be a variable geometry turbine configured to adjust a flowrate of intake airflow traveling through the intake air-supply turbine and where during the first operating condition, the method may further include, adjusting the geometry of the intake air-supply turbine based on engine output requests.

In any of the aspects described herein or combinations of the aspects, the method may further include during the first operating condition transferring energy from the generator to the energy storage device and during the second operating condition transferring energy from the energy storage device to the motor.

In any of the aspects described herein or combinations of the aspects, the first operating condition may be a condition where a compressor positioned upstream of the intake air-supply turbine is generating excess boost.

In any of the aspects described herein or combinations of the aspects, the engine system may also include an air-supply turbine valve positioned in an intake air-supply turbine conduit in the engine intake and a motor-driven compressor valve positioned in a motor-driven compressor conduit in the engine intake.

In any of the aspects described herein or combinations of the aspects, the engine system may also include a control subsystem configured to, during a first operating condition, open the intake air-supply turbine valve and close the motor-driven compressor valve and during a second operating condition, close the intake air-supply turbine valve, open the motor-driven compressor valve, and command the motor to drive the motor-driven compressor.

In any of the aspects described herein or combinations of the aspects, the control subsystem may be configured to, during the first operating condition, command the generator to transfer energy to the energy storage device and during the second operating condition, command the energy storage device to transfer energy to the motor.

In any of the aspects described herein or combinations of the aspects, the engine system may also include a bypass conduit positioned in a parallel flow arrangement with the motor-driven compressor conduit and the intake air-supply turbine conduit and a bypass valve positioned in the bypass conduit, the control subsystem configured to adjust the bypass valve during the first and second operating conditions.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine system comprising:
a compressor in an engine intake;
an intake air-supply turbine arranged in the engine intake downstream of the compressor, an output shaft of the intake air-supply turbine coupled to a generator electrically coupled to an energy storage device; and
a motor-driven compressor in the engine intake in a parallel flow arrangement with the intake air-supply turbine and having a shaft coupled to a motor electrically coupled to the energy storage device.

2. The engine system of claim 1, further comprising an air-supply turbine valve positioned in an intake air-supply turbine conduit in the engine intake and a motor-driven compressor valve positioned in a motor-driven compressor conduit in the engine intake.

3. The engine system of claim 2, further comprising a control subsystem configured to, during a first operating condition, open the intake air-supply turbine valve and close the motor-driven compressor valve and, during a second operating condition, close the intake air-supply turbine valve, open the motor-driven compressor valve, and command the motor to drive the motor-driven compressor.

4. The engine system of claim 3, where the control subsystem is configured to, during the first operating condition, command the generator to transfer energy to the energy storage device and during the second operating condition, command the energy storage device to transfer energy to the motor.

5. The engine system of claim 3, further comprising a bypass conduit positioned in a parallel flow arrangement with the motor-driven compressor conduit and the intake air-supply turbine conduit and a bypass valve positioned in the bypass conduit, the control subsystem configured to adjust the bypass valve during the first and second operating conditions.

6. A motor vehicle comprising:
an internal combustion engine;
an air-supply tract providing a flow of intake air to the internal combustion engine;
an exhaust gas tract receiving exhaust gas from the internal combustion engine;
a compressor which is arranged in the air-supply tract;
an intake air-supply turbine which is arranged in an intake air-supply turbine conduit of the air-supply tract downstream of the compressor and is configured to transmit torque to a generator coupled to an energy storage device; and
a motor-driven compressor positioned in a motor-driven compressor conduit in a parallel flow arrangement with an intake conduit in the air-supply tract, the motor-driven compressor coupled to a motor configured to the energy storage device.

7. The motor vehicle of claim 6, further comprising an intake air-supply turbine valve positioned in the intake air-supply turbine conduit, a motor-driven compressor valve positioned in the motor-driven compressor conduit, and a control system configured to adjust the flow of the intake air through the intake air-supply turbine valve and the motor-driven compressor valve based on engine operating conditions.

8. The motor vehicle of claim 7, where the control system is configured to, during a first operating condition, open the intake air-supply turbine valve and close the motor-driven compressor valve.

9. The motor vehicle of claim 8, where the control system is configured to, during a second operating condition, open the motor-driven compressor valve and command the motor to drive the motor-driven compressor and close the intake air-supply turbine valve.

10. The motor vehicle of claim 8, where the first operating condition includes a condition where the compressor is generating excess boost.

11. The motor vehicle of claim 6, where the intake air-supply turbine has adjustable guiding vanes.

12. The motor vehicle of claim 6, where the generator is configured to receive a variable torque input from the intake air-supply turbine.

13. The motor vehicle of claim 6, where the air-supply tract comprises a bypass conduit positioned in a parallel flow arrangement with the motor-driven compressor conduit and the intake air-supply turbine conduit.

14. The motor vehicle of claim 13, further comprising a bypass valve positioned in the bypass conduit.

15. The motor vehicle of claim 6, where the compressor is connected to an exhaust gas turbine which is arranged in the exhaust gas tract, the exhaust gas turbine configured to transmit torque to the compressor.

16. A method for operation of an engine system comprising:

determining operating condition of the engine via a controller based on indications from one or more of an engine speed sensor, a pedal position sensor, and a manifold air pressure sensor;

during a first operating condition determined via the controller, permitting intake airflow through an intake air-supply turbine positioned upstream of a cylinder via the controller commanding an air-supply turbine valve actuator to open an air-supply turbine valve positioned in an intake air-supply turbine conduit in an engine intake to drive a generator rotationally coupled to the intake air-supply turbine, the generator coupled to an energy storage device; and inhibiting intake airflow through a motor-driven compressor arranged in a parallel flow arrangement with the intake air-supply turbine via the controller commanding a motor-driven compressor valve actuator to close a motor-driven compressor valve positioned in a motor-driven compressor conduit in the engine intake, the motor-driven compressor coupled to a motor coupled to the energy storage device; and during a second operating condition determined via the controller, permitting intake airflow through the motor-driven compressor via the controller commanding the motor-driven compressor valve actuator to open the motor-driven compressor valve while the motor-driven compressor receives rotation input from the motor; and inhibiting intake airflow through the intake air-supply turbine via the controller commanding the air-supply turbine valve actuator to close the air-supply turbine valve.

17. The method of claim 16, further comprising during the first or second operating conditions, adjusting a bypass valve via the controller, the bypass valve in a bypass conduit positioned in a parallel flow arrangement with the motor-driven compressor and the intake air-supply turbine to alter an amount of airflow passing through the bypass conduit.

18. The method of claim 16, where the turbine is a variable geometry turbine configured to adjust a flowrate of intake airflow traveling through the intake air-supply turbine and where, during the first operating condition, the method further comprises adjusting a geometry of the intake air-supply turbine based on engine output requests, the engine output requests determined via the controller based on indications from the pedal position sensor.

19. The method of claim 16, further comprising, during the first operating condition, transferring energy from the generator to the energy storage device and, during the second operating condition, transferring energy from the energy storage device to the motor.

20. The method of claim 16, where the first operating condition is a condition where a compressor positioned upstream of the intake air-supply turbine is generating excess boost.

* * * * *